US011451556B2

(12) United States Patent
Mills, Jr. et al.

(10) Patent No.: US 11,451,556 B2
(45) Date of Patent: *Sep. 20, 2022

(54) DYNAMIC PROFILE CONTROL SYSTEM

(71) Applicant: Bank of America Corporation, Charlotte, NC (US)

(72) Inventors: Robert E. Mills, Jr., Stockbridge, GA (US); Murali Santhanam, Naperville, IL (US); Kerry Kurt Simpkins, Fort Mill, SC (US); John B. Hall, Charlotte, NC (US); Michael J. Pepe, Jr., Wilmington, DE (US); Jasher David Fowles, Davidson, NC (US); Jeanne Moulton, Concord, NC (US); Susan Deans, Virginia Beach, VA (US); Athena Barlow, Jersey City, NJ (US)

(73) Assignee: Bank of America Corporation, Charlotte, NC (US)

(*) Notice: Subject to any disclaimer, the term of this patent is extended or adjusted under 35 U.S.C. 154(b) by 128 days.

This patent is subject to a terminal disclaimer.

(21) Appl. No.: 17/108,401

(22) Filed: Dec. 1, 2020

(65) Prior Publication Data

US 2021/0084047 A1 Mar. 18, 2021

Related U.S. Application Data

(63) Continuation of application No. 16/157,473, filed on Oct. 11, 2018, now Pat. No. 10,917,410.

(51) Int. Cl.
*G06F 16/23* (2019.01)
*H04L 9/40* (2022.01)

(52) U.S. Cl.
CPC ........ *H04L 63/102* (2013.01); *G06F 16/2365* (2019.01); *H04L 63/08* (2013.01); *H04L 63/105* (2013.01)

(58) Field of Classification Search
CPC ..... H04L 63/102; H04L 63/08; H04L 63/105; G06F 16/2365
See application file for complete search history.

(56) References Cited

U.S. PATENT DOCUMENTS 5,815,592 A 9/1998 Mennie et al.
5,901,253 A 5/1999 Tretter
(Continued)

OTHER PUBLICATIONS

Apr. 17, 2020—U.S. Non-Final Office Action—U.S. Appl. No. 16/157,276.
(Continued)

*Primary Examiner* — Ali S Abyaneh
(74) *Attorney, Agent, or Firm* — Banner & Witcoff, Ltd.

(57) ABSTRACT

Systems for dynamic profile control are provided. A system may receive first check data that may include a number of checks written over a predetermined time period for an account. The first check data may be analyzed to determine the number of checks written in a predetermined time period and the number may be compared to one or more thresholds. Based on the comparison, a first tier level may be identified for the account. A profile record may be generated including a check profile that may include one or more parameters based on the identified first tier level. The system may then build the profile by adding checks to the profile upon determining that the checks meet predefined criteria. After a predetermined time period has expired, the system may process additional data to determine whether the identified tier level and associated parameters should be modified.

21 Claims, 13 Drawing Sheets

(56) References Cited

U.S. PATENT DOCUMENTS

| | | | |
|---|---|---|---|
| 6,026,189 | A | 2/2000 | Greenspan |
| 6,430,320 | B1 | 8/2002 | Jia et al. |
| 7,920,714 | B2 | 4/2011 | O'Neil |
| 8,155,425 | B1 | 4/2012 | Mandel |
| 8,417,017 | B1 | 4/2013 | Beutel et al. |
| 8,824,772 | B2 | 9/2014 | Viera et al. |
| 9,129,340 | B1 * | 9/2015 | Medina, III ......... G06V 30/414 |
| 9,218,701 | B2 | 12/2015 | Cantley et al. |
| 9,652,690 | B2 | 5/2017 | Eid et al. |
| 9,843,731 | B2 | 12/2017 | Shimosato |
| 10,423,938 | B1 | 9/2019 | Gaeta et al. |
| 2002/0146170 | A1 | 10/2002 | Rom |
| 2004/0247168 | A1 * | 12/2004 | Pintsov ................. G06V 10/22 382/209 |
| 2005/0243378 | A1 | 11/2005 | Klein et al. |
| 2006/0202012 | A1 | 9/2006 | Grano et al. |
| 2006/0255124 | A1 * | 11/2006 | Hoch ..................... G07F 19/00 235/379 |
| 2007/0136198 | A1 | 6/2007 | Foth et al. |
| 2008/0025555 | A1 | 1/2008 | Visan et al. |
| 2012/0170829 | A1 | 7/2012 | Jackson et al. |
| 2012/0177281 | A1 * | 7/2012 | Frew ................... G06Q 20/042 382/137 |
| 2014/0112571 | A1 | 4/2014 | Viera et al. |
| 2014/0184848 | A1 | 7/2014 | Shimosato |
| 2014/0355865 | A1 | 12/2014 | Cantley et al. |
| 2015/0139492 | A1 | 5/2015 | Murakami et al. |
| 2015/0161765 | A1 | 6/2015 | Kota et al. |
| 2015/0186753 | A1 | 7/2015 | Horita |
| 2016/0085564 | A1 | 3/2016 | Arcese et al. |
| 2016/0253573 | A1 | 9/2016 | Eid et al. |
| 2017/0011404 | A1 * | 1/2017 | Clower .................. G06Q 40/02 |
| 2017/0052944 | A1 | 2/2017 | Choudhry et al. |
| 2018/0096340 | A1 | 4/2018 | Omojola et al. |

OTHER PUBLICATIONS

Jul. 13, 2020—U.S. Notice of Allowance—U.S. Appl. No. 16/157,326.
May 29, 2020—U.S. Non-Final Office Action—U.S. Appl. No. 16/157,384.
Jun. 19, 2020—U.S. Notice of Allowance—U.S. Appl. No. 16/212,043.
Jun. 4, 2020—U.S. Non-Final Office Action—U.S. Appl. No. 16/211,963.
Aug. 6, 2020—U.S. Notice of Allowance—U.S. Appl. No. 16/157,276.
Aug. 25, 2020—U.S. Notice of Allowance—U.S. Appl. No. 16/157,326.
Sep. 11, 2020—U.S. Notice of Allowance—U.S. Appl. No. 16/157,384.
Sep. 16, 2020—U.S. Notice of Allowance—U.S. Appl. No. 16/212,043.
Sep. 11, 2020—U.S. Notice of Allowance—U.S. Appl. No. 16/211,963.
Aug. 13, 2021—U.S. Non-Final Office Action—U.S. Appl. No. 17/061,738.

* cited by examiner

DYNAMIC PROFILE CONTROL SYSTEM

CROSS REFERENCE TO RELATED APPLICATIONS

This application is a continuation of and claims priority to co-pending U.S. application Ser. No. 16/157,473, filed Oct. 11, 2018, and entitled "Dynamic Profile Control System" which is incorporated herein by reference in its entirety.

This application is related to U.S. application Ser. No. 16/157,276 filed Oct. 11, 2018, and entitled, "Item Validation and Image Evaluation System," U.S. application Ser. No. 16/157,326 filed Oct. 11, 2018, and entitled, "Image Evaluation and Dynamic Cropping System," and U.S. application Ser. No. 16/157,384 filed Oct. 11, 2018, and entitled, "Enterprise Profile Management and Control System." All of which are incorporated herein by reference in their entirety.

BACKGROUND

Aspects of the disclosure relate to electrical computers, systems, and machine learning. In particular, one or more aspects of the disclosure relate to dynamic profile control.

Thwarting unauthorized activity on one or more accounts is an important function. As unauthorized actors become more sophisticated, it can be difficult to identify unauthorized instruments. Further, even systems configured to identify unauthorized instruments can identify false positives. In some arrangements, an instrument or document being evaluated for validity may be compared to one or more other documents. However, identifying an appropriate number of documents to maintain for comparison can be difficult. Accordingly, it would be advantageous to control a document profile to include a desired number of documents for comparison based on one or more factors customized to an entity.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity.

In some examples, a system, computing platform, or the like, may receive first check data. The first check data may include a number of checks written over a predetermined time period for an account, user, payer, entity or the like. The first check data may be analyzed to determine a volume or number of checks written in a predetermined time period and the volume or number may be compared to one or more thresholds or ranges. Based on the comparison, a first tier level may be identified for the account, user, payer, entity or the like.

In some examples, a profile record may be generated including a check profile. The check profile may include one or more parameters determined based on the identified first tier level. The system, computing platform, or the like, may then build the profile by adding checks or other documents to the profile upon determining that the checks or other documents meet predefined criteria (e.g., are valid, authentic, or the like).

After a predetermined time period has expired, the system, computing platform, or the like, may request second check data. The second check data may be processed and compared to the one or more thresholds or ranges and/or the identified first tier level. If the volume or number of checks in a second predetermined time period is greater than a threshold associated with the first tier level, the profile may be modified to be associated with the second tier level and one or more parameters may also be modified. In some examples, the status of the profile may be regularly monitored.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamic profile control to improve accuracy in evaluating validity of documents.

As mentioned above, protecting user data and thwarting unauthorized activity is a priority for most users. In some examples, unauthorized actors may generate unauthorized or invalid checks or other instruments. Accordingly, in some examples, systems may evaluate the checks or other instruments or documents to determine validity and/or authenticity of the checks, instruments or other documents by comparing a check being evaluated to previously evaluated checks or other documents. However, because checks can be written by different users, may vary based on pattern or check stock, or the like, it is advantageous to have a plurality of checks available for comparison. For instance, the more checks that are written for a particular account, entity, payer, or the like, the greater the variation that may occur in the different checks. By having a sufficient number of checks available for comparison (e.g., based on characteristics of the user, payer, entity, account, or the like), accuracy in determining validity and/or authenticity may be improved.

Accordingly, aspects described herein are directed to systems for generating a document or check profile including a desired or sufficient number of checks or other documents available for comparison when evaluating checks or other documents for validity. In some examples, the number of checks or other documents stored in the profile may be based on a particular user, entity, account, payer, or the like. For instance, high volume check writers may have a greater number of checks available for comparison in the profile in order to ensure that as many different check writers, check patterns, or the like, are captured in the check profile. In some arrangements, the check profile status may be monitored (e.g., on a periodic basis, continuously, or the like) to ensure that a sufficient number of checks are stored, to modify parameters of a profile based on characteristics of the entity, user, payer, account, or the like, and the like.

These and various other arrangements will be discussed more fully below.

Figure 1A:
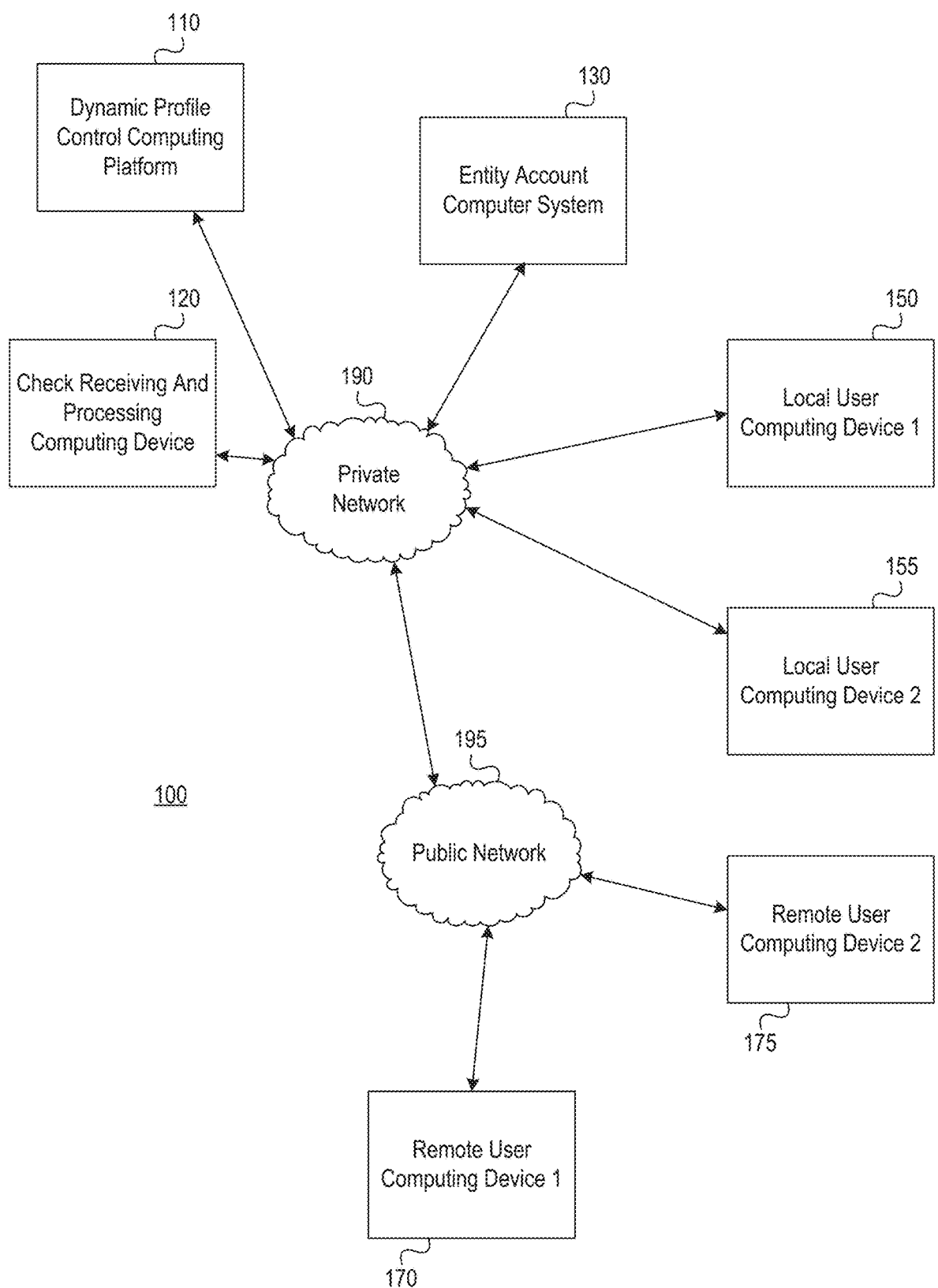
FIGS. 1A and 1B depict an illustrative computing environment for implementing dynamic profile control functions in accordance with one or more aspects described herein.
Figure 1B:
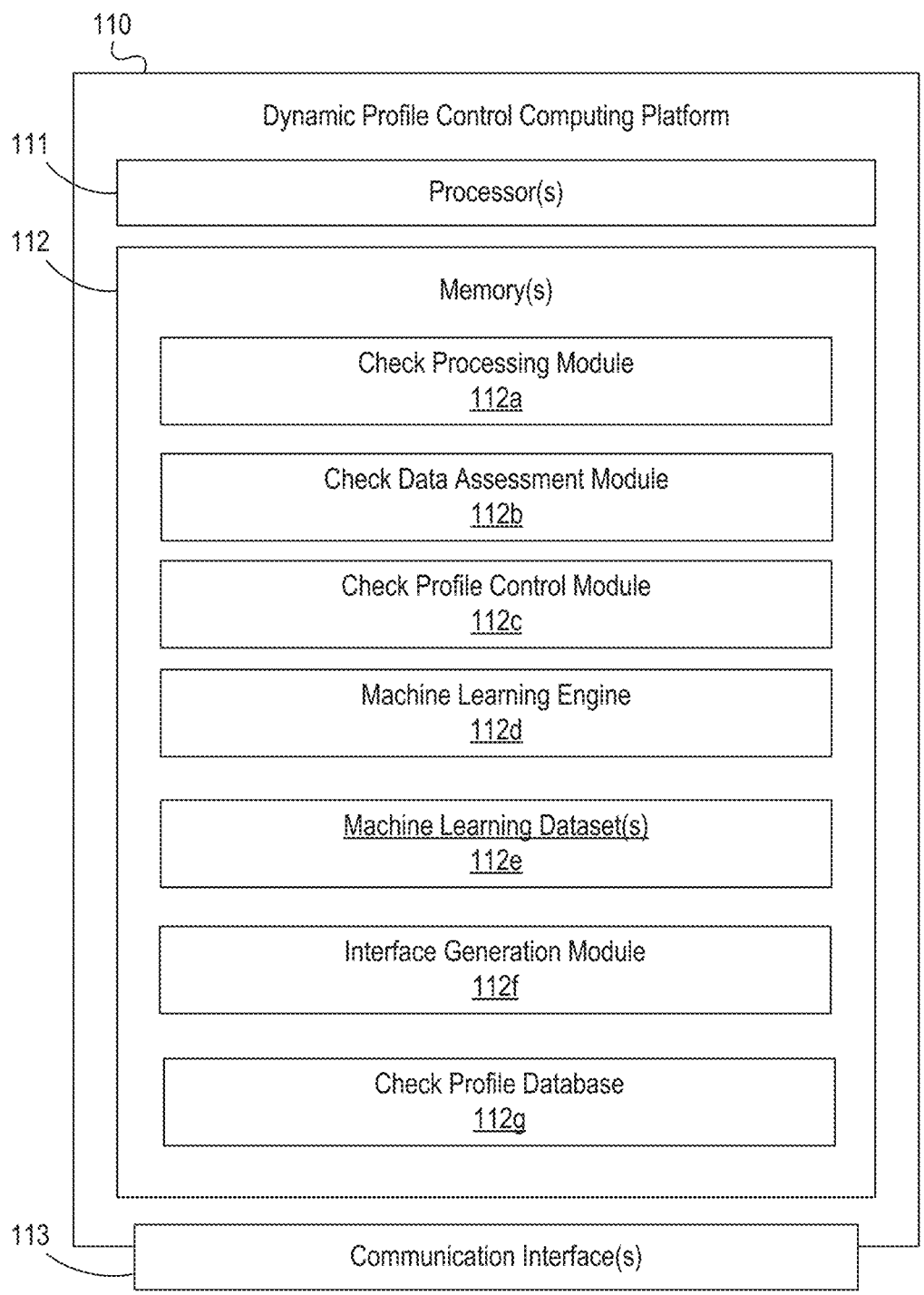

FIGS. 1A and 1B depict an illustrative computing environment for implementing and using a system for customized profile control in accordance with one or more aspects described herein. Referring to FIG. 1A, computing environment 100 may include one or more computing devices and/or other computing systems. For example, computing environment 100 may include dynamic profile control computing platform 110, a check receiving and processing computing device 120, an entity account computer system 130, a first local user computing device 150, a second local user computing device 155, a first remote user computing device 170, and a second remote user computing device 175.

Dynamic profile control computing platform 110 may be configured to host and/or execute a machine learning engine to provide intelligent, dynamic profile control functions with respect to checks or other instruments or documents. In some examples, dynamic profile control computing platform 110 may generate a request for check data associated with a user. The check data may include checks written by the user or associated with an account of the user, a number of checks associated with the user or account, and the like. In some examples, the user may be a large entity, such as a corporation, university, government agency, or the like, for which many checks may be written but one or more people, using one or more types of check stock or check patterns, or the like.

The request may be transmitted to, for instance, an entity account computer system, such as entity account computer system 130. Entity account computer system 130 may be a system associated with a financial institution of the account. The entity account computer system may receive, process and/or store checks and check data related to checks written on one or more accounts, associated with one or more users, and the like. The entity account computer system 130 may further include other account and/or user information.

The entity account computer system 130 may receive and process the request and may generate check data response data that includes the requested check data. The check data response data may be transmitted to the dynamic profile control computing platform 110 and may include checks written from a certain account, a number of checks written in a predetermined time period, or the like.

The dynamic profile control computing platform 110 may receive the check data response data and may process it to identify a volume of checks written over a certain time period for a particular user, account, or the like. The volume of checks may then be compared to one or more tiers to identify an appropriate tier level for the user associated with the account. Based on the identified tier level, the dynamic profile control computing platform 110 may generate a profile record and establish one or more profile parameters, such as a minimum number of checks or check images to be stored, a maximum number of checks or check images to be stored, and the like.

The dynamic profile control computing platform 110 may then build the profile in the generated profile record by adding one or more checks or check images to the profile. In some examples, the checks or check images added may be checks or check images previously analyzed, such as by a check receiving and processing computing device 120, for validity and/or authenticity. For instance, check receiving and processing computing device 120 may include one or more computing devices, servers, or the like, configured to receive checks or other instruments from a variety of sources. For instance, checks may be received via online or mobile banking applications executing on a user computing device, such as remote user computing device 170, 175, from an automated teller machine (ATM) or other self-service kiosk, from a banking associated within a financial institution location, or the like.

In some examples, the checks may be received by the check receiving and processing computing device 120 and may be processed, in real-time or near real-time, to evaluate the validity of the check or other instrument. In some examples, processing the check or other instrument may include comparing the check to one or more checks in a user profile associated with users drafting the checks (e.g., account holder, payer, or the like) and generating a score representing a likelihood that the check is fraudulent. For instance, the check receiving and processing computing device 120 may compare the received check to a plurality of checks in a document or check profile to evaluate various regions, fields or aspects of the check to determine whether the received check matches one or more checks in the profile. Based on a number of matching items, a score may be determined. For instance, if several regions, fields, or the like, match, a low score may be generated indicating that there is a low likelihood that the check is fraudulent. If few or no items match, a high score may be generated indicating that it is very likely that the check is fraudulent.

In some examples, the check receiving and processing computing device 120 may evaluate checks for validity and/or authenticity using machine learning to identify any known indicators of unauthorized activity. In still other examples, a check or check image may be deemed valid by waiting a predetermined period of time to determine whether any claims of unauthorized activity are raised with respect to the check.

Additionally or alternatively, the dynamic profile control computing platform 110 may receive checks or check images directly from a local user computing device 150, 155, remote user computing device 170, 175, or the like.

Accordingly, dynamic profile control computing platform 110 may build the profile in the generated profile record by adding one or more checks or check images to the profile. In some arrangements, one or more checks or check images may be held for a predetermined time period prior to being added. For instance, a check or check image may be held for a predetermined number of days, weeks, or the like (e.g., 7 days, 14 days, 4 weeks, or the like) to determine whether any issues are raised with the check (e.g., if a claim for unauthorized activity is brought). If not issues arise, the check may be added to the profile. If an issue arises, the check might not be added. In some examples, an amount of time the check is held may be based on a volume of checks for the entity, payer, user, or the like.

In some examples, checks or check images may be added until at least a minimum number of checks or check images for the identified tier level is reached. At that point, the profile may be used to evaluate subsequently received checks for validity. In some examples, checks may continue to be added until a maximum number of checks in the profile is reached. If a maximum number of checks or check images for a tier level is reached, no additional checks may be added to the profile. In some examples, the minimum number of checks may be any desired number of checks. In at least some example arrangements, the minimum number of checks may be one half of the maximum number of checks.

At expiration of a predetermined time period (e.g., one week, one month, 3 months, or the like) the dynamic profile control computing platform 110 may generate a second request for check data. The second request may be transmitted to the entity account computer system 130 and second check response data may be generated and transmitted to the dynamic profile control computing platform 110.

The second check response data may be received and processed to determine a volume per predetermined time period of checks written. The volume may then be compared a threshold or volume range for the identified tier. If the volume is greater than the threshold or identified range for the tier, the profile may be modified to be associated with a second, different tier or tier level, which may have different parameters (e.g., different minimum number of checks or check images, different maximum number of checks or check images, or the like). If the tier is modified, the profile may be modified accordingly to add additional checks until the minimum associated with the second tier level is reached and, in some examples, until the maximum number of checks is reached. Accordingly, the dynamic profile control computing platform 110 may provide customized profile control that adapts to different size users (e.g., different volume of checks written). This may aid in accurately evaluating the validity or authenticity of check received and evaluated by comparison to checks in the profile. For instance, larger entities having a greater volume of checks are more likely to have checks written or signed by different agents of the entity, checks written using different check stock or patterns, or the like. Accordingly, it is advantageous to have a greater number of checks in a profile to ensure that as many possible accurate points of comparison are provided in the profile.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the dynamic profile computing platform 110, entity account computer system 130, and/or the check receiving and processing computing device 120 to control parameters of the system, update rules, modify settings, and the like. Local user computing device 150, 155 may also include ATMs or other self-service kiosks, as well as banking associated computing devices, that may receive checks from a user and may transmit the check or check images for further processing.

The remote user computing devices 170, 175 may be used to communicate with, for example, dynamic profile control computing platform 110, entity account computer system 130, and/or check receiving and processing computing device 120 to capture check image data, transmit check image data, and the like. For instance, remote user computing devices 170, 175 may include user computing devices, such as mobile devices including smartphones, tablets, laptop computers, and the like, that may be used to access and/or execute online banking applications, mobile banking applications, or the like.

In one or more arrangements, check receiving and processing computing device 120, entity account computer system 130, local user computing device 150, local user computing device 155, remote user computing device 170, and/or remote user computing device 175 may be any type of computing device or combination of devices configured to perform the particular functions described herein. For example, check receiving and processing computing device 120, entity account computer system 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of check receiving and processing computing device 120, entity account computer system 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic profile control computing platform 110. As illustrated in greater detail below, dynamic profile control computing platform 110 may include one or more computing devices configured to perform one or more of the functions described herein. For example, dynamic profile control computing platform 110 may include one or more computers (e.g., laptop computers, desktop computers, servers, server blades, or the like).

As mentioned above, computing environment 100 also may include one or more networks, which may interconnect one or more of dynamic profile control computing platform 110, check receiving and processing computing device 120, entity account computer system 130, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic profile control computing platform 110, check receiving and processing computing device 120, entity account computer system 130, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic profile control computing platform 110, check receiving and processing computing device 120, entity account computer system 130, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic profile control computing platform 110, check receiving and processing computing device 120, entity account computer system 130, local user computing device 150, local user computing device 155) with one or more networks and/or computing devices that are not associated with the organization. For example, remote user computing device 170, and/or remote user computing device 175 might not be associated with an organization that operates private network 190 (e.g., because remote user computing device 170 and remote user computing device 175 may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., dynamic profile control computing platform 110, check receiving and processing computing device 120, entity account computer system 130, local user computing device 150, and/or local user computing device 155).

Referring to FIG. 1B, dynamic profile control computing platform 110 may include one or more processors 111, memory 112, and communication interface 113. A data bus may interconnect processor(s) 111, memory 112, and communication interface 113. Communication interface 113 may be a network interface configured to support communication between dynamic profile control computing platform 110 and one or more networks (e.g., private network 190, public network 195, or the like). Memory 112 may include one or more program modules having instructions that when executed by processor(s) 111 cause dynamic profile control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic profile control computing platform 110 and/or by different computing devices that may form and/or otherwise make up dynamic profile control computing platform 110.

For example, memory 112 may have, store, and/or include a check processing module 112a. Check processing module 112a may store instructions and/or data that may cause or enable the dynamic profile control computing platform 110 to receive one or more checks, check data, check image data, and the like, for further evaluation. In some examples, check processing module 112a may extract or parse data associated with the received check or data to identify a user, check or document profile associated with the payer of the check being evaluated. In some examples, data from the received check or check image may be used to identify a payer of a check. The identified payer may then be used to identify a check or document profile associated with the payer being generated or stored in, for example, check profile database 112g. Check profile database 112g may include one or more check profiles storing checks and/or check images, or other document images, associated with a payer.

Dynamic profile control computing platform 110 may further have, store and/or include check data assessment module 112b. Check data assessment module 112b may store instructions and/or data that may cause or enable the dynamic profile control computing platform 110 to generate a request for check data, receive check response data and analyze the check response data to determine a volume of checks written for a particular payer, user, account, entity, or the like, over a predetermined time period.

Dynamic profile control computing platform 110 may further have, store and/or include check profile control module 112c. Check profile control module 112c may store instructions and/or data that may cause or enable the dynamic profile control computing platform 110 to receive volume data from, for example, check data assessment module 112b and compare the volume data to one or more tiers. Based on the comparison, a tier level for the user, entity, payer, account, or the like, may be identified. In some examples, three tiers may be used. However, more or fewer tiers may be used without departing from the invention.

The check profile control module 112c may generate a profile record based on the identified tier level. The profile record may include one or more parameters of the profile, such as a minimum number of checks or check images to be stored in the profile (e.g., before the profile is available for use), a maximum number of checks to be stored in the check profile, and the like. The check profile control module 112c may then generate an instruction to build the check profile associated with the generated profile record by populating the profile with checks associated with the payer, account, user, entity, or the like. The check profile control module 112c may monitor a number of checks in the profile and, upon reaching a maximum number of checks, may prevent additional checks from being added without first deleting one or more checks or check images in the profile.

The check profile control module 112c may further evaluate later received volume data to maintain or modify a tier level associated with the profile, modify one or more parameters of the profile if the tier level is changed, and the like.

In some examples, one or more aspects of evaluating a volume of checks, evaluating a number of checks in a profile, controlling a number of checks in a profile, and the like may be performed using machine learning. For instance, dynamic profile control computing platform 110 may further have, store and/or include a machine learning engine 112d and machine learning datasets 112e. Machine learning engine 112d and machine learning datasets 112e may store instructions and/or data that may cause or enable dynamic profile control computing platform 110 to determine one or more tier levels and minimums or maximums associated therewith, evaluate an account, payer, entity, user or the like to determine an appropriate tier level, leverage volume or other check data to generate one or more recommendations, and the like. The machine learning datasets 112e may be generated based on analyzed data (e.g., data from previously received data, previously analyzed checks, and the like), raw data, and/or received from one or more outside sources.

The machine learning engine 112d may receive check images and/or data and/or profile data and, using one or more machine learning algorithms, may generate one or more machine learning datasets 112e. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112d may analyze data to identify patterns of activity, sequences of activity, and the like, to generate one or more machine learning datasets 112e.

In some examples, the machine learning datasets 112e may include machine learning data linking a volume of checks written to an optimal number of checks to store in a profile for comparison. In some arrangements, the machine learning datasets 112e may store machine learning data linking a volume of checks, type of checks, or the like, to one or more recommendations for other products or services to offer to a user, entity, payer, or the like, associated with the profile. For instance, based on a volume of checks, tier level of the profile, or the like, the machine learning datasets 112e may be used to generate one or more recommendations for products or services to offer to a user.

In some arrangements, machine learning datasets 112e may include machine learning data linking historical data associated with the user, payer, entity or the like associated with the profile, such as history of unauthorized activity or items having unauthorized activity, to an optimal period of time a check or check image should be held before being added to the profile.

Dynamic Profile control computing platform 110 may further have, store and/or include an interface generation module 112f. Interface generation module 112f may include instructions and/or data that may cause or enable the dynamic profile control computing platform 110 to generate one or more user interfaces displaying one or more check or document images in a profile. In some examples, the interfaces may be refreshed or regenerated based on deletion of data, addition of data, and the like.

The dynamic profile control computing platform 110 may further have, store and/or include document or check profile database 112g. Check profile database 112g may store checks or other document profiles and associated information, such as name of a payer, account information, contact information, or the like. The checks, check images or other documents in a document profile may correspond to a plurality of previously processed checks or other instruments that, in at least some examples, were determined to be valid.

FIGS. 2A-2H depict an illustrative event sequence for implementing and using dynamic profile control functions in accordance with one or more aspects described herein. The events shown in the illustrative event sequence are merely one example sequence and additional events may be added, or events may be omitted, without departing from the invention.

Figure 2A:
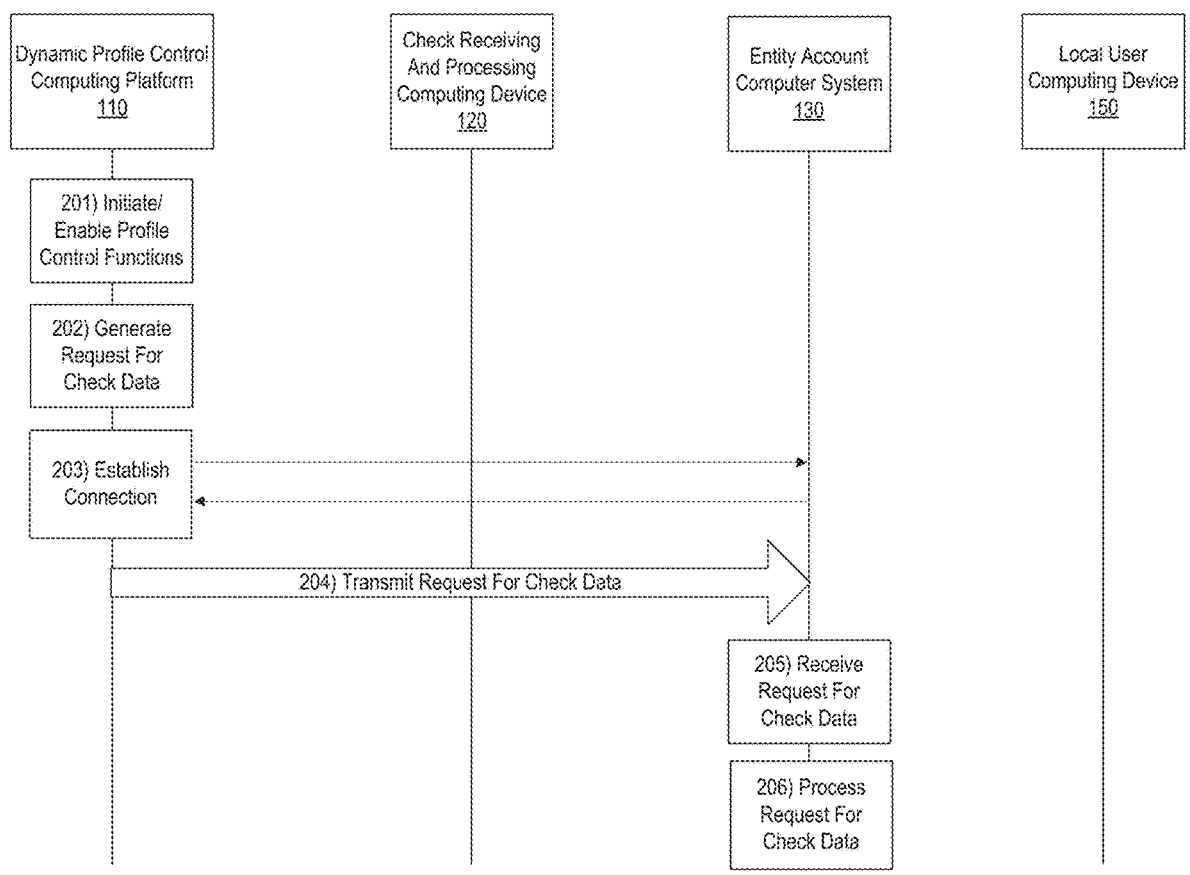
FIGS. 2A-2H depict an illustrative event sequence for implementing dynamic profile control functions in accordance with one or more aspects described herein.

Referring to FIG. 2A, at step 201, one or more profile control functions may be enabled, initiated and/or activated. For instance, one or more functions of the dynamic profile control computing platform 110 that were previously disabled may be enabled.

At step 202, a request for check data may be generated. For instance, a request for a number of checks written for an entity, payer, account or the like, may be generated.

At step 203, a connection may be established between the dynamic profile control computing platform 110 and the entity account computer system 130. For instance, a first wireless connection may be established between the dynamic profile control computing platform 110 and the entity account computer system 130. Upon establishing the first wireless connection, a communication session may be initiated between the dynamic profile control computing platform 110 and the entity account computer system 130.

At step 204, the generated request for check data may be transmitted from the dynamic profile control computing platform 110 to the entity account computer system 130. For instance, the request for check data may be transmitted during the communication session initiated upon establishing the first wireless connection.

At step 205, the request for check data may be received by the entity account computer system 130. At step 206, the request for check data may be processed. For instance, information in the request identifying a payer, user, account, entity or the like associated with the desired check data may be extracted from the request and the requested information may be retrieved.

Figure 2B:
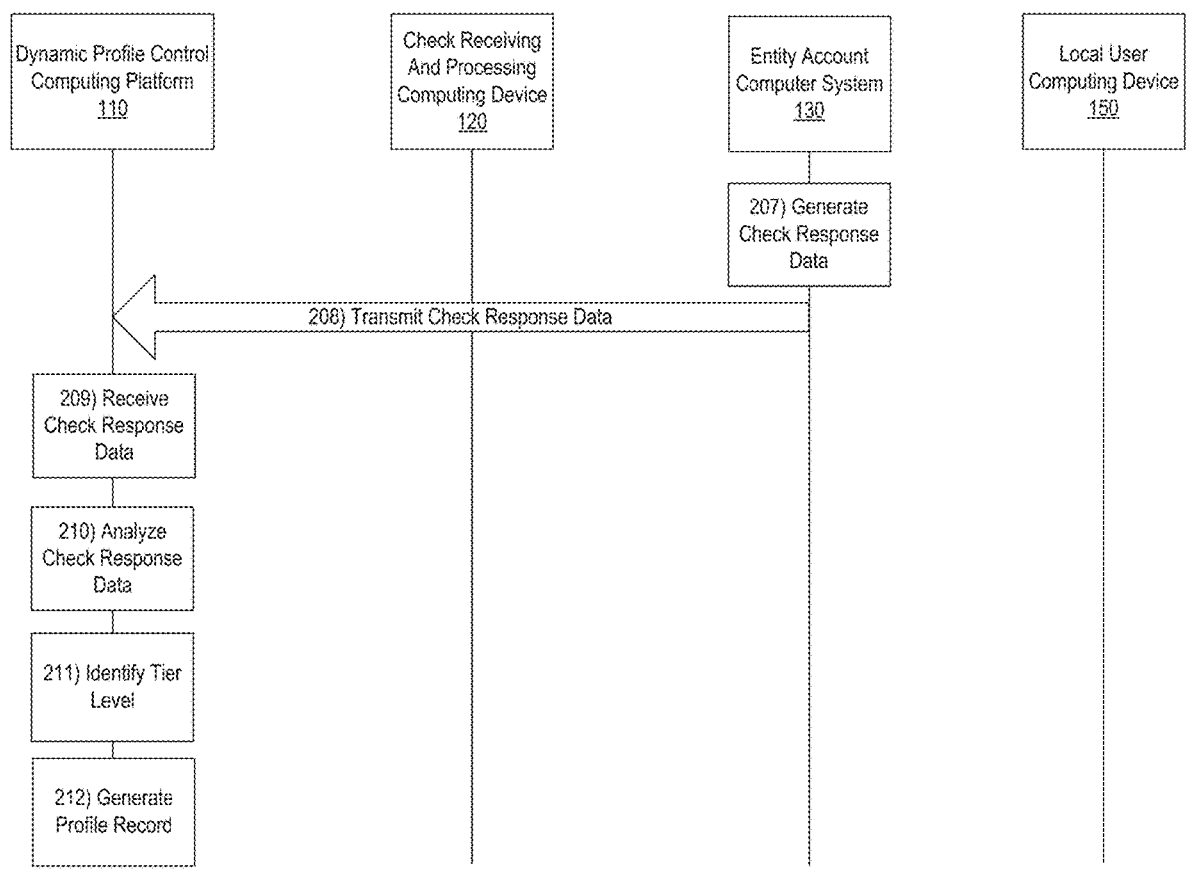

With reference to FIG. 2B, at step 207, first check response data may be generated. The first check response data may include the data extracted with respect to the payer, user, account or entity. In some examples, the first check response data may include a number of checks written, a time period in which checks were written, and the like.

At step 208, the first check response data may be transmitted from the entity account computer system 130 to the dynamic profile control computing platform 110. At step 209, the first check response data may be received by the dynamic profile control computing platform 110.

At step 210, the first check response data may be analyzed to determine a volume or number (e.g., total number) of checks written in a predetermined time period. For instance, the dynamic profile control computing platform 110 may analyze the received check response data to determine a number of checks written for a particular account, user, entity, payer, or the like, over a period of time (e.g., one month, one week, three months, or the like).

At step 211, a tier level for the user, payer, entity, account, or the like may be identified. For instance, the volume of checks written over the predetermined time period may be compared to one or more thresholds or ranges of volumes. Based on the comparison, a tier level will be identified and assigned to the user, account, entity, payer, and the like.

At step 212, a check profile record may be generated. For instance, a new profile may be created and a profile record may be generated and stored in, for example, check profile database 112g.

Figure 2C:
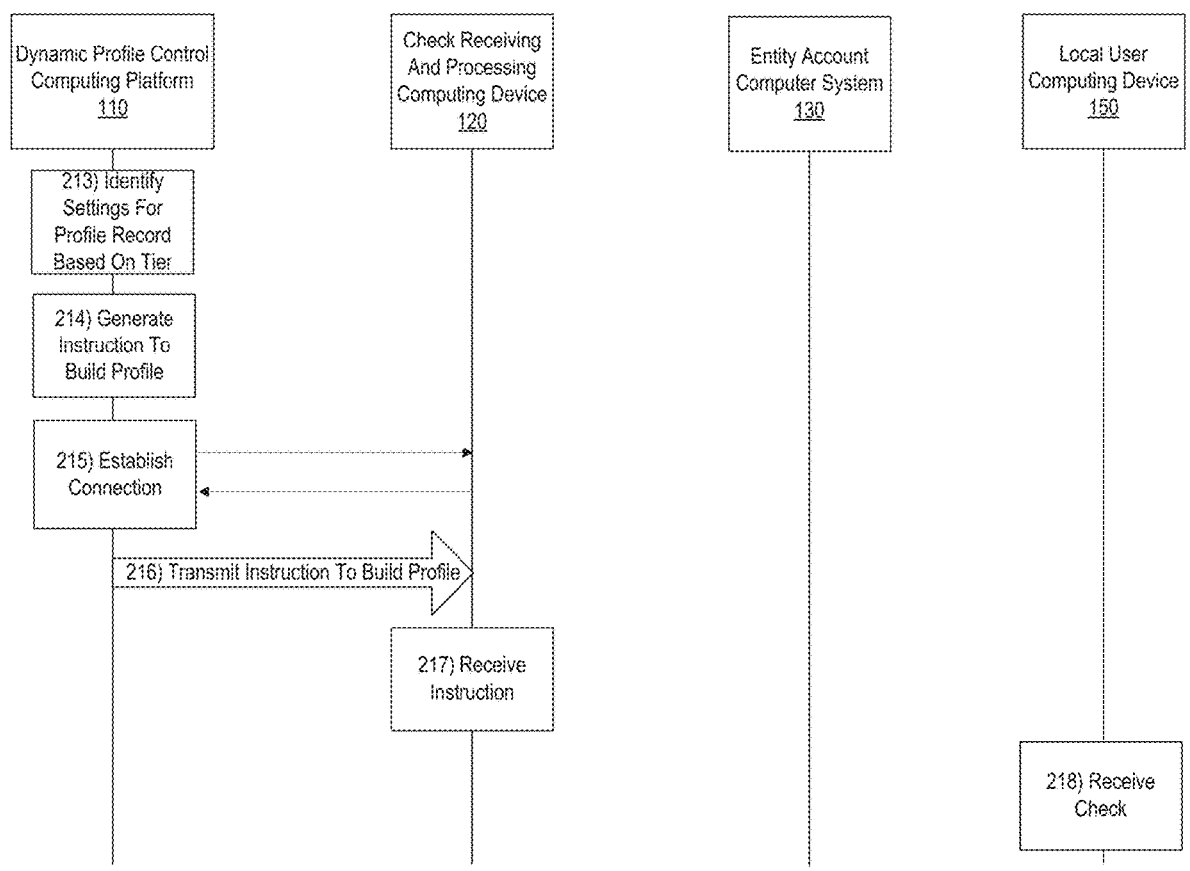

With reference to FIG. 2C, at step 213, one or more setting or parameters for the profile may be determined or identified based on the identified tier level. For instance, a minimum number of checks to store in a profile (e.g., before the profile may be used for evaluating validity of subsequent checks), a maximum number of checks to store in a profile, a number of days to hold a check prior to adding it to the profile, and the like, may be determined or identified.

At step 214, an instruction to build a profile may be generated. For instance, the instruction to generate the profile may include an instruction to transmit checks or check images to the dynamic profile control computing platform 110 for storage in the profile.

At step 215, a connection may be established between the dynamic profile control computing platform 110 and the check receiving and processing computing device 120. For instance, a second wireless connection may be established between the dynamic profile control computing platform 110 and the check receiving and processing computing device 120. Upon establishing the second wireless connection, a communication session may be initiated between the check receiving and processing computing device 120 and the dynamic profile control computing platform 110.

At step 216, the instruction to build the profile may be transmitted to, for example, check receiving and processing computing device 120. For instance, the instruction may be transmitted during the communication session initiated upon establishing the second wireless connection. At step 217, the instruction may be received and executed by the check receiving and processing computing device 120.

At step 218, a check may be received by a device. For instance, a check or other instrument may be received by local user computing device 150. As discussed herein, local user computing device 150 may include an ATM or other self-service kiosk, a banking associate computing device, or the like. Although the event sequence shown and described includes receiving a check by a local user computing device 150, in some examples, the check may be received by a remote user computing device 170 (e.g., via mobile or online banking applications) without departing from the invention.

Figure 2D:
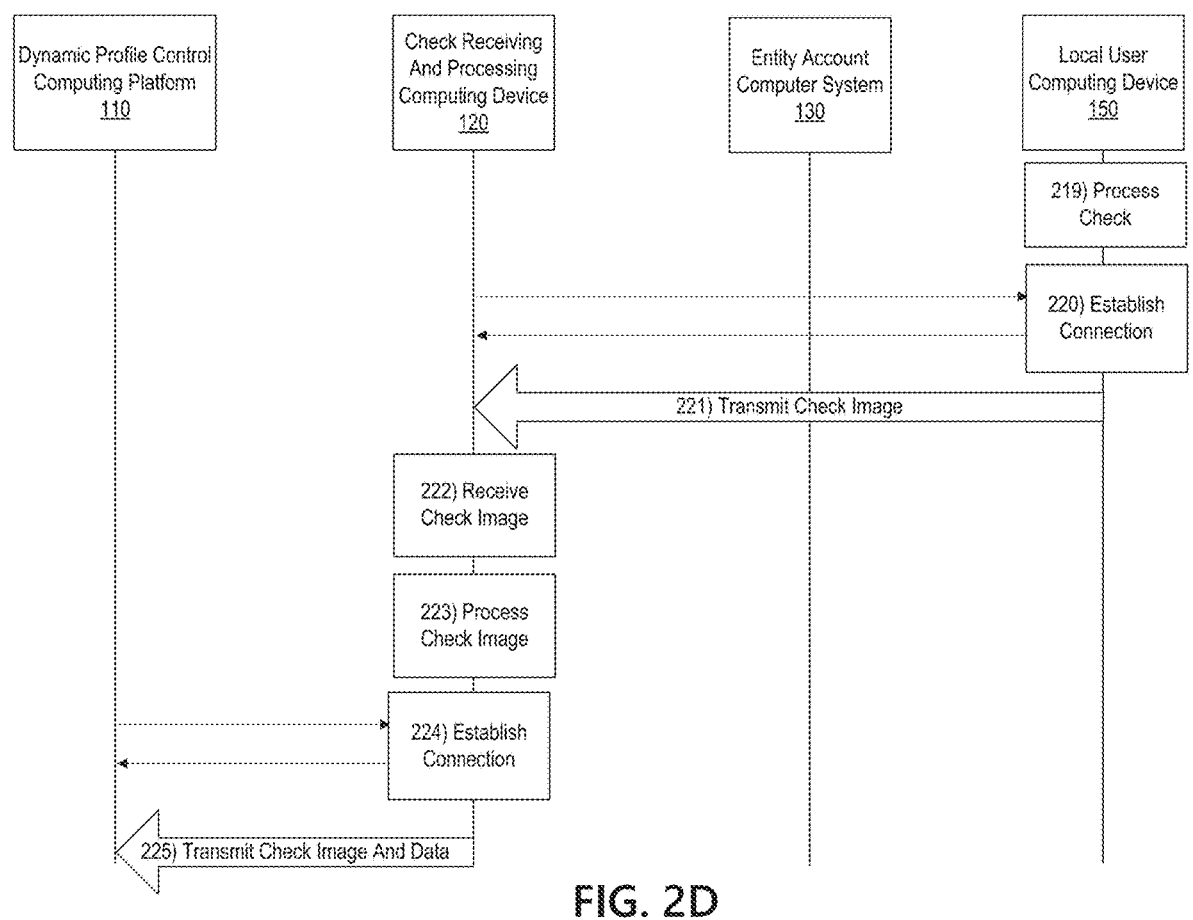

With reference to FIG. 2D, at step 219, preliminary processing of the check may be performed. For instance, the check may be converted to a digital image. Additionally or alternatively, the check image may be stored by the local user computing device 150, transmitted to another device for storage or the like.

At step 220, a connection may be established between the local user computing device 150 and the check receiving and processing computing device 120. For instance, a third wireless connection may be established between the local user computing device 150 and the check receiving and processing computing device 120. Upon establishing the third wireless connection, a communication session may be initiated between the check receiving and processing computing device 120 and the local user computing device 150.

At step 221, the check or check image may be transmitted from the local user computing device 150 to the check receiving and processing computing device 120. For instance, the check image may be transmitted during the communication session initiated upon establishing the third wireless connection.

At step 222, the check or check image may be received by the check receiving and processing computing device 120. At step 223, the check or check image may be processed by the check receiving and processing computing device 120. For instance, the check receiving and processing computing device 120 evaluate the check for validity and/or authenticity. In some examples, the evaluation may be performed by comparing the received check or check image to one or more checks or check images in a document profile. In other examples, the evaluation may be performed using machine learning and/or historical data. In still other examples, the check may be held by, for example, check receiving and processing computing device 120 for a predetermined time period (e.g., to permit a claim of unauthorized activity to be raised). After expiration of the predetermined time period, the check or check image may be deemed valid or authenticated.

At step 224, a connection may be established between the check receiving and processing computing device 120 and the dynamic profile control computing platform 110. For instance, a fourth wireless connection may be established between the check receiving and processing computing device 120 and the dynamic profile control computing platform 110. Upon establishing the fourth wireless connection, a communication session may be initiated between the check receiving and processing computing device 120 and the dynamic profile control computing platform 110.

At step 225, the check image may be transmitted from the check receiving and processing computing device 120 to the dynamic profile control computing platform 110. For instance, the check image may be transmitted during the communication session initiated upon establishing the fourth wireless connection. In some examples, the check image may include associated data, such as a validity or authenticity of the check or check image, a validity score of the check or check image, or the like.

Figure 2E:
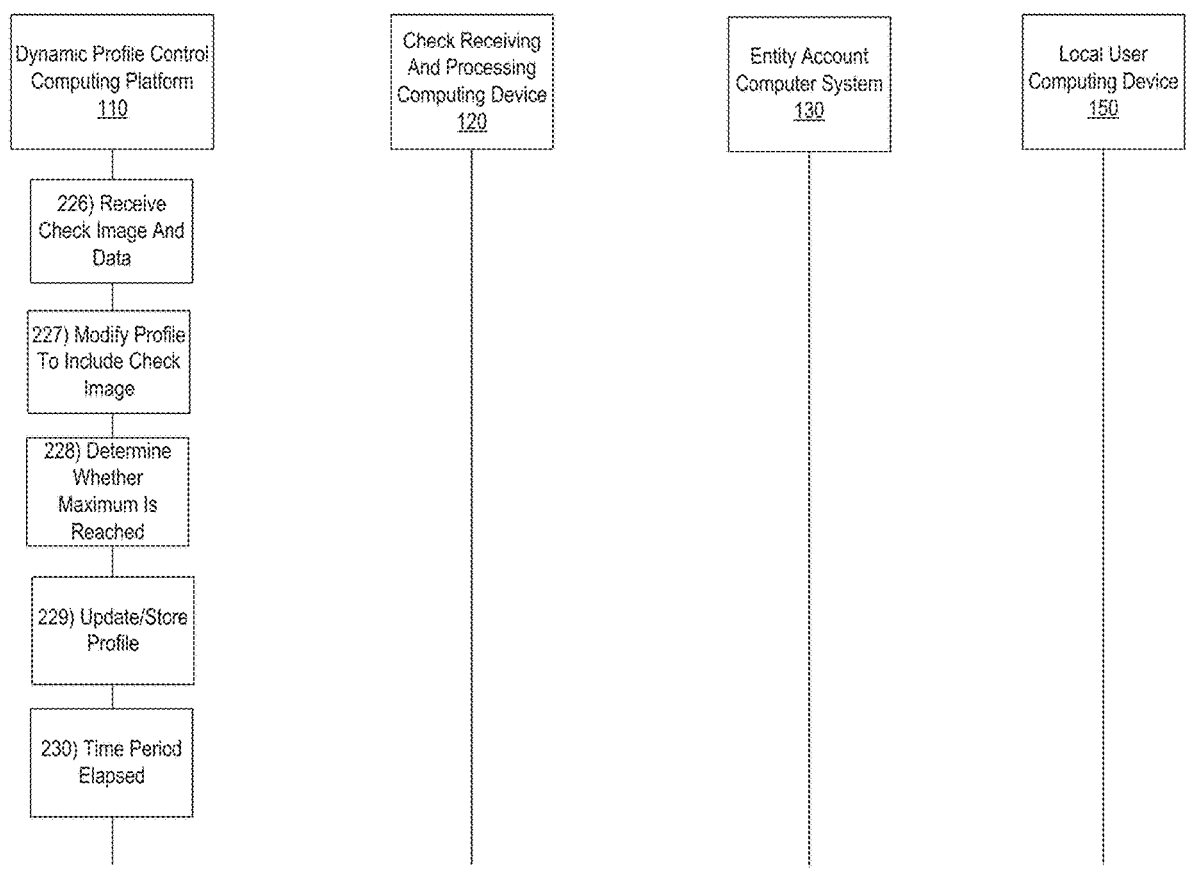

With reference to FIG. 2E, at step 226, the check or check image and/or associated data may be received by the dynamic profile control computing platform 110. At step 227, the generated profile may be modified to include the check or check image received.

At step 228, after modifying the profile to include the check or check image at step 227, a number of checks in the profile may be identified and/or analyzed to determine whether a maximum number of checks has been reached. If so, the profile and associated checks may be stored and no additional checks or check images may be added without first deleting one or more checks or check images. If not, additional checks may be added to the profile. The profile may be updated or stored at step 229.

At step 230, the system may determine whether a predetermined time period has elapsed. For instance, the system may continuously monitor a status of one or more profiles on a period basis. Accordingly, upon expiration of a predetermined time period, a status of a profile may be further evaluated.

Figure 2F:
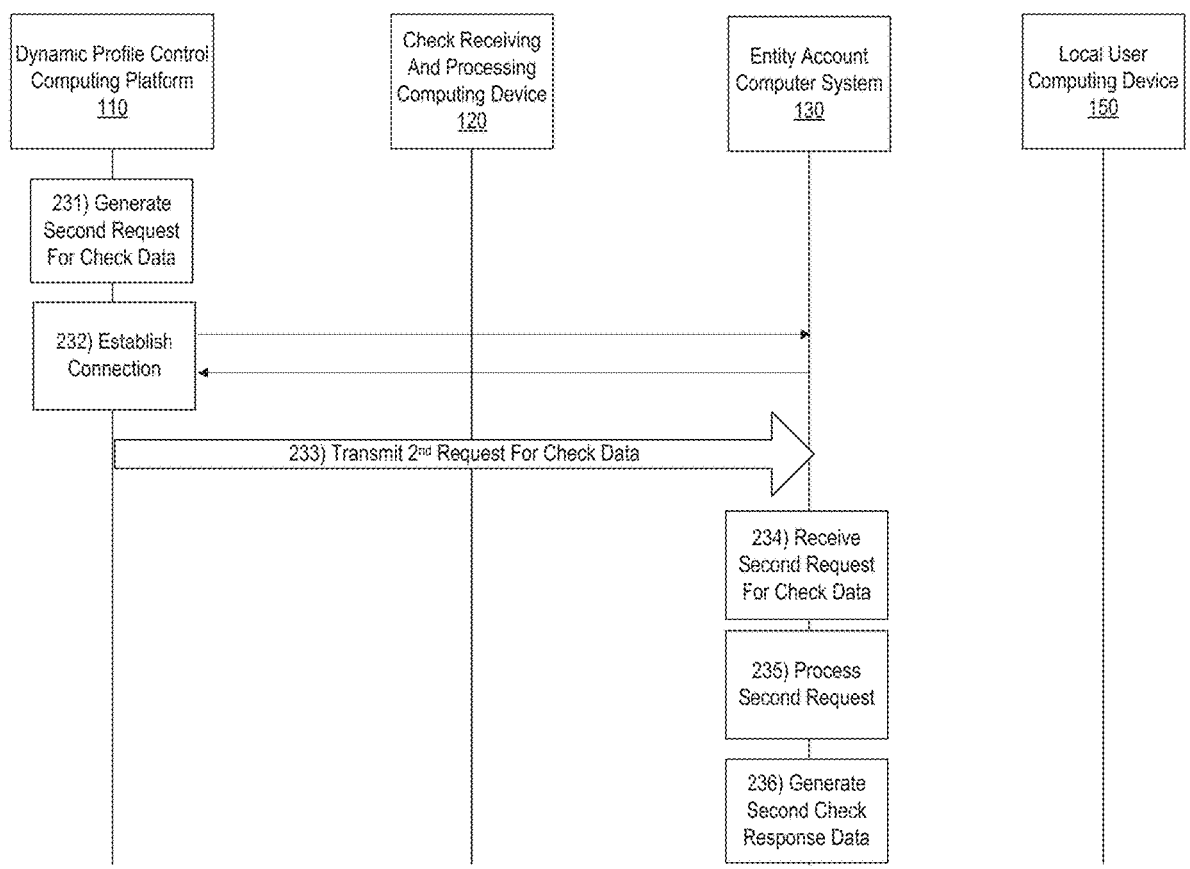

With reference to FIG. 2F, at step 231, a second request for check data may be generated. For instance, a second, subsequent request for a number of checks written for an entity, payer, account or the like, may be generated.

At step 232, a connection may be established between the dynamic profile control computing platform 110 and the entity account computer system 130. For instance, a fifth wireless connection may be established between the dynamic profile control computing platform 110 and the entity account computer system 130. Upon establishing the fifth wireless connection, a communication session may be initiated between the dynamic profile control computing platform 110 and the entity account computer system 130.

At step 233, the generated second request for check data may be transmitted from the dynamic profile control computing platform 110 to the entity account computer system 130. For instance, the second request for check data may be transmitted during the communication session initiated upon establishing the fifth wireless connection.

At step 234, the second request for check data may be received by the entity account computer system 130. At step 235, the second request for check data may be processed. For instance, information in the second request identifying a payer, user, account, entity or the like associated with the desired check data may be extracted from the request and the requested information may be retrieved.

At step 236, second check response data may be generated. The second check response data may include the data extracted with respect to the payer, user, account or entity. In some examples, the second check response data may include a number of checks written, a time period in which checks were written, and the like.

Figure 2G:
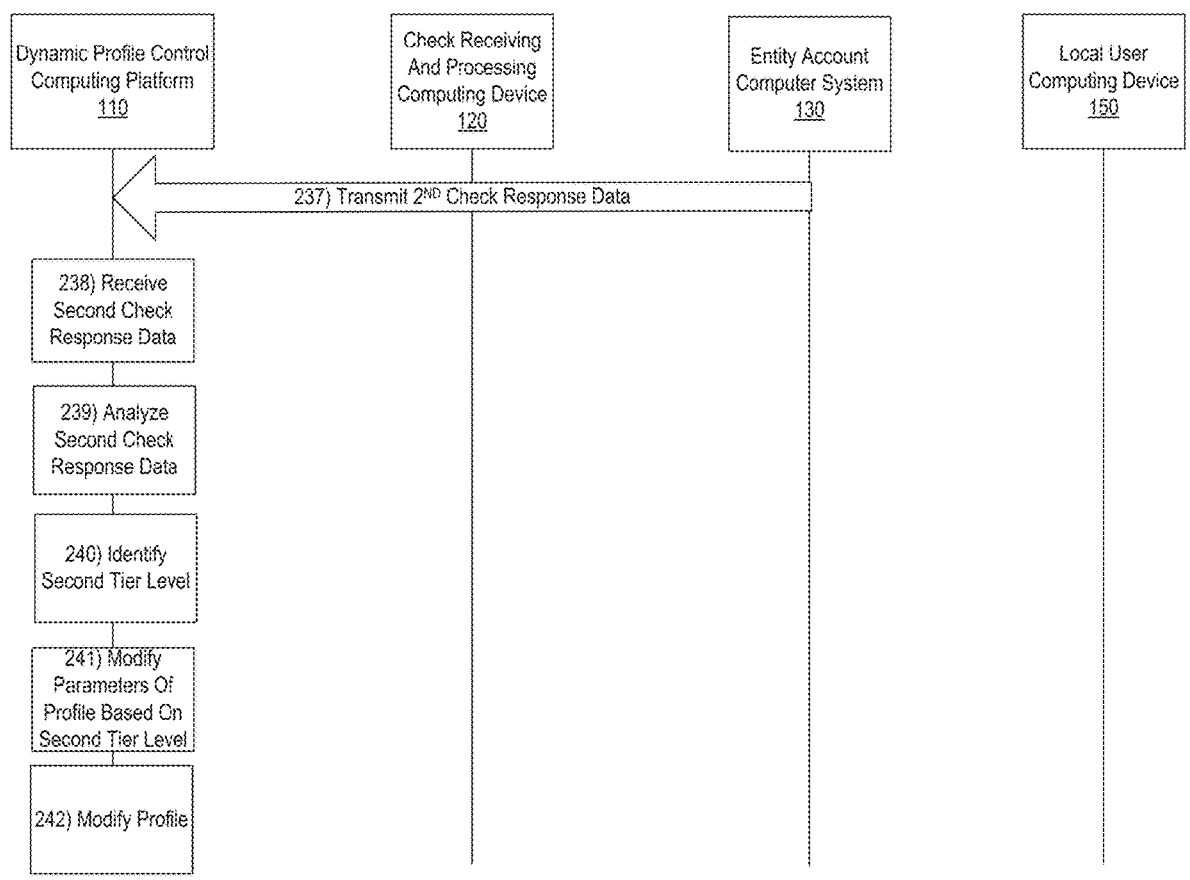

With reference to FIG. 2G, at step 237, the second check response data may be transmitted from the entity account computer system 130 to the dynamic profile control computing platform 110. At step 238, the second check response data may be received by the dynamic profile control computing platform 110.

At step 239, the second check response data may be analyzed to determine a volume of checks written in a predetermined time period. For instance, the dynamic profile control computing platform 110 may analyze the received check response data to determine a number of checks written for a particular account, user, entity, payer, or the like, over a period of time (e.g., one month, one week, three months, or the like).

At step 240, a second tier level for the user, payer, entity, account, or the like may be identified. For instance, the volume of checks written over the predetermined time period may be compared to one or more thresholds or ranges of volumes. Based on the comparison, a second tier level will be identified and assigned to the user, account, entity, payer, and the like. In some examples, the second tier level may be different from the tier level (e.g., first tier level). For instance, if the volume of checks has increased, the second tier level might be a higher level than a previous level. In other examples, the second tier level may be the same as the previous tier level.

At step 241, one or more parameters of the profile may be modified based on the identified second tier level. For instance, a minimum number of checks, maximum number of checks, or the like, may be modified based on the identified second tier level.

At step 242, the profile may be modified or refreshed. For instance, if a tier level has increased, additional checks or check images may be added to the profile to meet a minimum associated with the increased tier level.

Figure 2H:
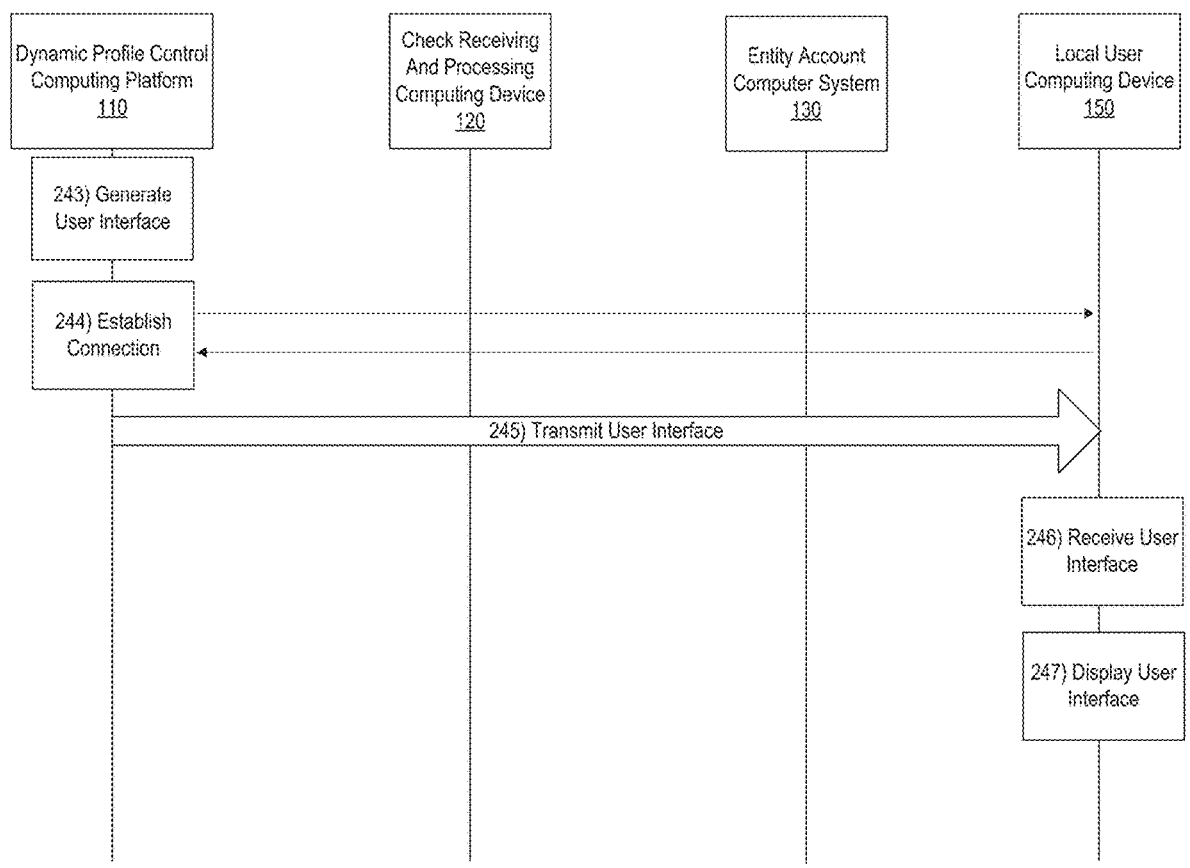

With reference to FIG. 2H, at step 243, a user interface may be generated. In some examples, the user interface may include the modified or refreshed profile and may include a display of one or more checks, check images, or other documents in the profile.

At step 244, a connection may be established between the dynamic profile control computing platform 110 and local user computing device 150. For instance, a sixth wireless connection may be established between the dynamic profile control computing platform 110 and the local user computing device 150. Upon establishing the sixth wireless connection, a communication session may be initiated between the dynamic profile control computing platform 110 and the local user computing device 150.

At step 245, the user interface including the refreshed profile may be transmitted from the dynamic profile control computing platform 110 to the local user computing device 150. For instance, the user interface may be transmitted during the communication initiated upon establishing the sixth wireless connection.

At step 246, the user interface including the refreshed profile may be received by the local user computing device 150. At step 247, the local user computing device 150 may display the user interface including the refreshed profile on a display of the local user computing device 150.

Figure 3:
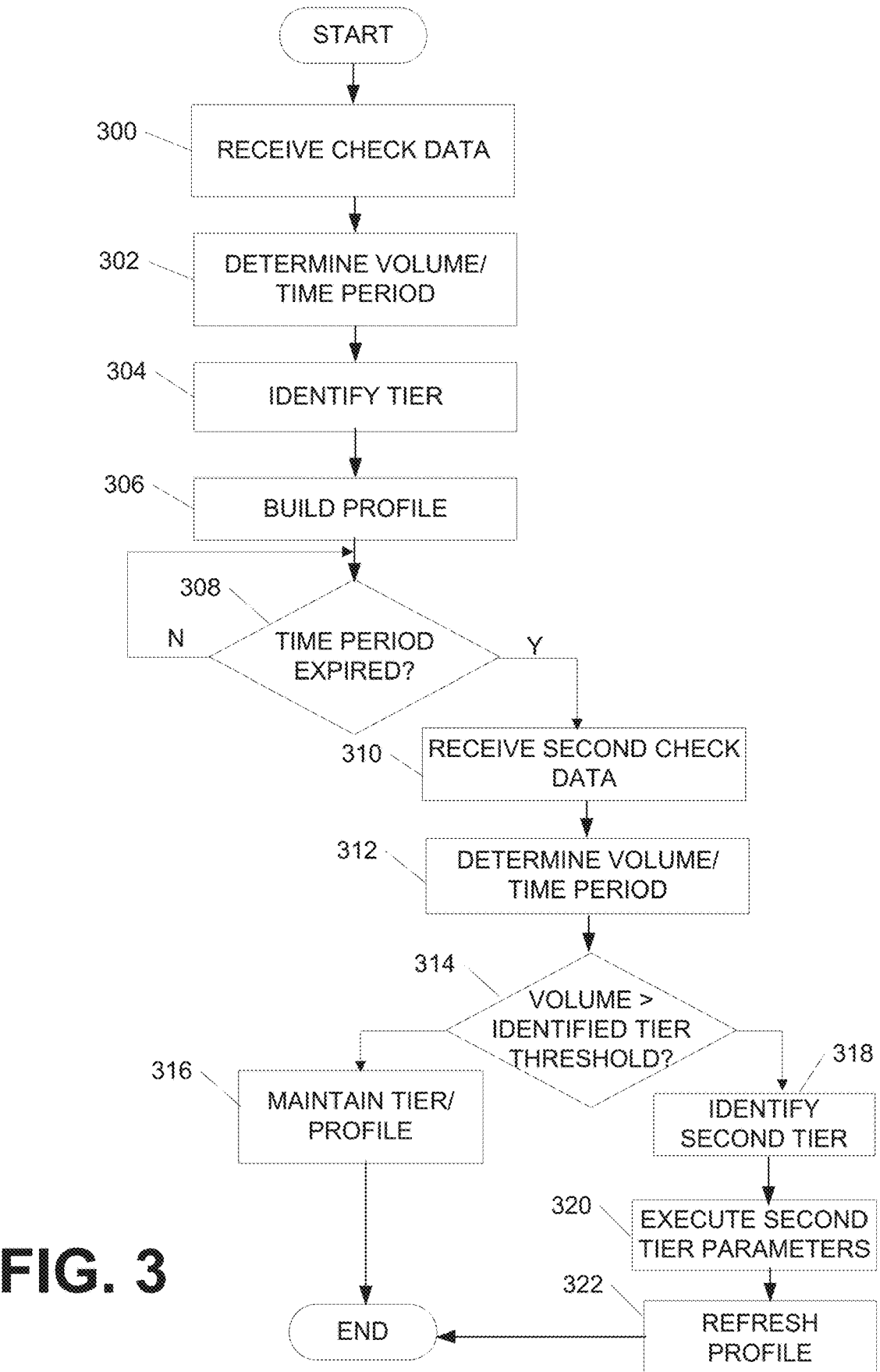
FIG. 3 depicts an illustrative method for implementing and using a system to perform dynamic profile control functions, according to one or more aspects described herein.

FIG. 3 is a flow chart illustrating one example method of providing dynamic profile control functions according to one or more aspects described herein. The processes illustrated in FIG. 3 are merely some example processes and functions. The steps shown may be performed in a different order, more steps may be added, or one or more steps may be omitted without departing from the invention.

At step 300, check data may be received. For instance, first check data associated with a user, entity, account, payer, or the like may be received. The first check data may include a volume or number of checks written, a time period in which the checks were written, and the like.

At step 302, the first check data may be analyzed to determine a number of checks written in a predetermined time period. For instance, the dynamic profile control computing platform 110 may determine a number of checks written in, for example, one month.

At step 304, a first tier may be identified. For instance, the determined number of checks written in the time period may be compared to one or more threshold or ranges of numbers of checks written. In some examples, each threshold or range of number of checks written may correspond to a tier level. One or more aspects of a check profile may be based on the tier level. Accordingly, by comparing the determined number of checks written in the time period to the one or more thresholds or ranges, an appropriate first tier may be identified.

At step 306, a check profile may be built. For instance, a profile record may be generated and one or more parameters of the profile may be determined based on the identified first tier level. For instance, a minimum number of checks to be stored in the profile, a maximum number of checks to be stored in the profile, and the like, may be determined. One or more checks or check images may then be added to the profile and the profile may be refreshed to include the added checks or check images. In some examples, checks may be added until a minimum number is reached. At that point, the profile may be used to evaluate incoming checks to determine validity and/or authenticity (e.g., by comparing the incoming check to checks in the profile). Further, checks may continue to be added until a maximum number of checks is reached. At that point, no further checks may be added until one or more checks are deleted from the profile.

At step 308, a determination may be made as to whether a time period has expired. For instance, the dynamic profile control computing platform 110 may monitor, on a period or aperiodic basis, a status of the profile. Accordingly, if the predetermined time has not expired, the process may continue to monitor the time period by returning to step 308.

If the time period has expired, second check data may be requested and received at step 310. For instance, additional check data such as number of checks, time period in which the checks were written, and the like, may be received.

At step 312, a volume or number of checks written in a predetermined time period may be determined. For instance, based on the second check data received, a number of checks written in a predetermined time period may be determined.

At step 314, the volume or number of checks determined in step 312 may be compared to the threshold or range corresponding to the first tier level. If the identified volume or number is greater than the threshold or range corresponding to the first tier level identified in step 304, a second, different tier may be identified in step 318. At step 320, parameters associated with the second tier may be executed and the profile and associated parameters may be modified. At step 322, the profile may be refreshed.

If, at step 314 the determined volume is not greater than the volume for the first tier, the tier and profile, and any associated parameters, may be maintained at step 316.

As discussed herein, aspects described are directed to systems for dynamically controlling a document or check profile. By periodically or continuously monitoring a status of a profile, the system may ensure that a desired number of checks or other documents are available for comparison when determining validity. This may improve accuracy in determining validity and may reduce the number of false positives identified by the system. In some examples, one or more aspects described herein may be performed in real-time or near real-time.

As discussed herein, a volume or number of checks written for a particular user, payer, entity, account, or the like, may be determined or identified for a predetermined time period. This volume or number may be compared to one or more thresholds or ranges associated with different tiers. For instance, in some examples, four tiers may be used, each having different thresholds or ranges. More or fewer tiers may be used without departing from the invention.

For instance, if fewer than 25 checks are written for the predetermined time period, a tier level 1 may be identified. If between 25 and 100 checks are written, a tier 2 level may be identified. If between 101 and 999 checks are written, a tier 3 level may be identified. If 1000 or more checks are written in the predetermined time period, a tier 4 level may be identified.

In some examples, each tier level may have different parameters associated therewith that may be executed for a profile associated with the tier level. For instance, if a tier 1 level is identified, a minimum number of at least 5 checks are desired in the profile (e.g., the profile will build until at least 5 checks are stored) before the profile may be used for evaluation of subsequent checks and a maximum number of 15 checks may be stored.

If a tier 2 level is identified, a minimum number of at least 10 checks are desired in the profile (e.g., the profile will build until at least 10 checks are stored) before the profile may be used for evaluation of subsequent checks and a maximum of 25 checks may be stored in the profile.

If a tier 3 level is identified, a minimum number of at least 15 checks are desired in the profile (e.g., the profile will build until at least 15 checks are stored) before the profile maybe used for evaluation of subsequent checks and a maximum of 40 checks may be stored in the profile.

If a tier 4 level is identified, a minimum number of at least 30 checks are desired in the profile (e.g., the profile will build until at least 30 checks are stored) before the profile maybe used for evaluation of subsequent checks and a maximum of 75 checks may be stored in the profile.

The above described example thresholds and ranges are merely some examples and are not intended to limit the invention to only these values. Various other values, thresholds and/or ranges may be used without departing from the invention.

In some examples, as discussed herein, a check may be held for a predetermined time period (e.g., 7 days, 10 days, or the like) before being added to the profile. For instance, if an insufficient number of checks is stored in the profile (e.g., fewer than the minimum, fewer than the maximum) a check may be held for a predetermined time period in order to determine whether any claims of unauthorized activity are raised with respect to the check. At the expiration of the holding period, the check may be added to the profile and used for comparison in evaluation of subsequently received checks.

In some arrangements, a time period for which a check may be held prior to being added to the profile may be determined based on the user, payer, account, entity or the like associated with the check and/or profile. For instance, a profile having historical data indicating a threshold number of unauthorized activity incidents may have a longer holding period than a profile having less than a threshold number of unauthorized activity incidents. In some examples, machine learning may be used to determine a time period for which checks should be held prior to adding to the profile.

In some examples, checks in a profile may be refreshed based on predetermined rules. For instance, each month, a number of oldest checks may be deleted from the profile and a matching number of more recent checks may be added. In another example, if an account has transitioned to different check stock, check patterns, or the like, the system may delete some or all of the checks in the profile and replace them with checks having the new pattern, check stock, or the like.

In still other arrangements, the analysis of check volumes and numbers may be used to generate one or more recommendations for products or services that may be desirable to the entity, payer, user, or the like. For instance, machine learning may be used to leverage the volume data to identify one or more other products or services to offer to a user.

The above-described examples and arrangements are merely some example arrangements in which the systems described herein may be used. Various other arrangements employing aspects described herein may be used without departing from the invention.

Figure 4:
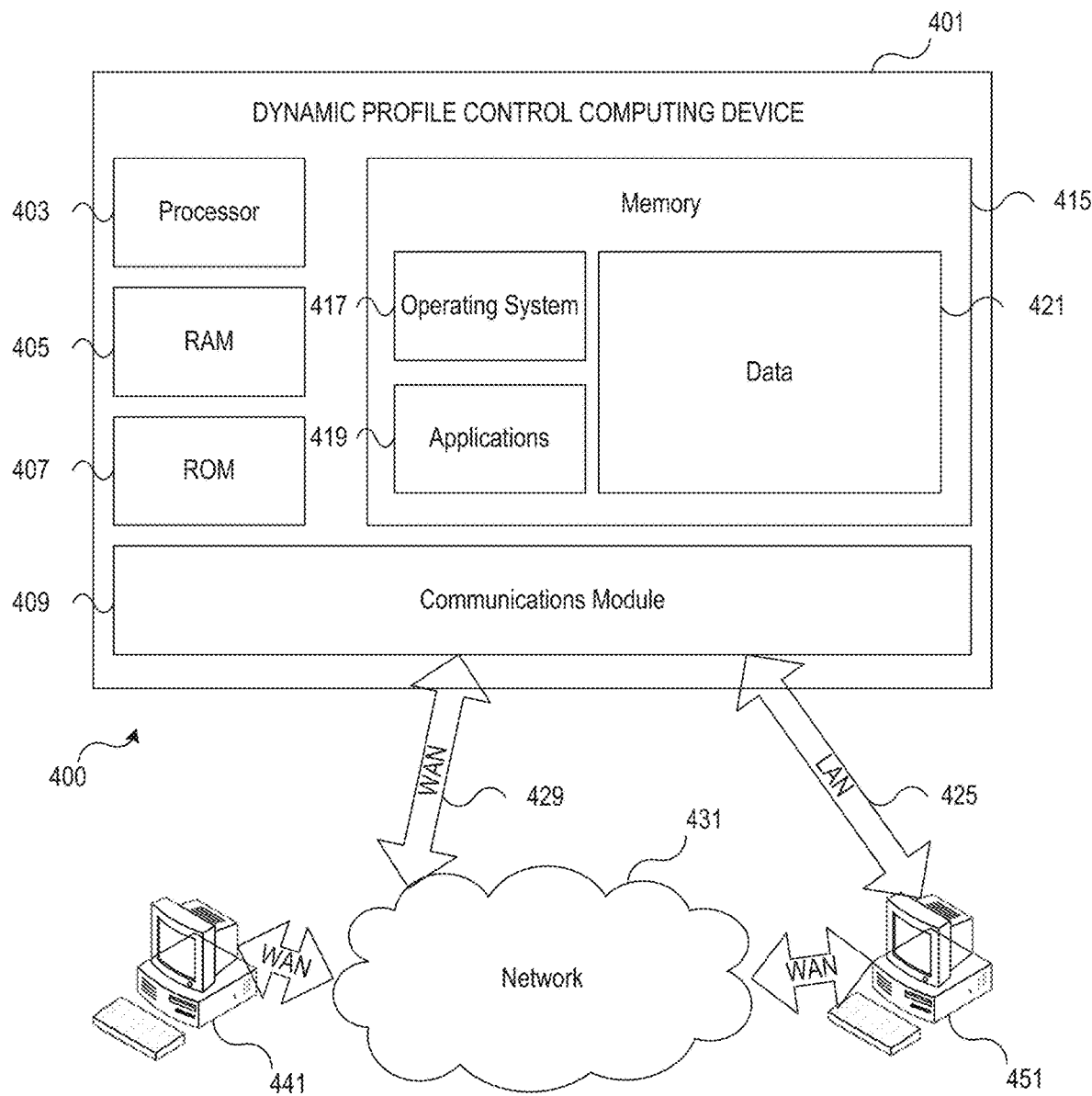
FIG. 4 illustrates one example operating environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include dynamic profile control computing device 401 having processor 403 for controlling overall operation of dynamic profile control computing device 401 and its associated components, including Random Access Memory (RAM) 405, Read-Only Memory (ROM) 407, communications module 409, and memory 415. Dynamic profile control computing device 401 may include a variety of computer readable media. Computer readable media may be any available media that may be accessed by dynamic profile control computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic profile control computing device 401. Such a processor may execute computer-executable instructions stored on a computer-readable medium.

Software may be stored within memory 415 and/or storage to provide instructions to processor 403 for enabling dynamic profile control computing device 401 to perform various functions as discussed herein. For example, memory 415 may store software used by dynamic profile control computing device 401, such as operating system 417, application programs 419, and associated database 421. Also, some or all of the computer executable instructions for dynamic profile control computing device 401 may be embodied in hardware or firmware. Although not shown, RAM 405 may include one or more applications representing the application data stored in RAM 405 while dynamic profile control computing device 401 is on and corresponding software applications (e.g., software tasks) are running on dynamic profile control computing device 401.

Communications module 409 may include a microphone, keypad, touch screen, and/or stylus through which a user of dynamic profile control computing device 401 may provide input, and may also include one or more of a speaker for providing audio output and a video display device for providing textual, audiovisual and/or graphical output. Computing system environment 400 may also include optical scanners (not shown).

Dynamic profile control computing device 401 may operate in a networked environment supporting connections to one or more remote computing devices, such as computing devices 441 and 451. Computing devices 441 and 451 may be personal computing devices or servers that include any or all of the elements described above relative to dynamic profile control computing device 401.

The network connections depicted in FIG. 4 may include Local Area Network (LAN) 425 and Wide Area Network (WAN) 429, as well as other networks. When used in a LAN networking environment, dynamic profile control computing device 401 may be connected to LAN 425 through a network interface or adapter in communications module 409. When used in a WAN networking environment, dynamic profile control computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 5:
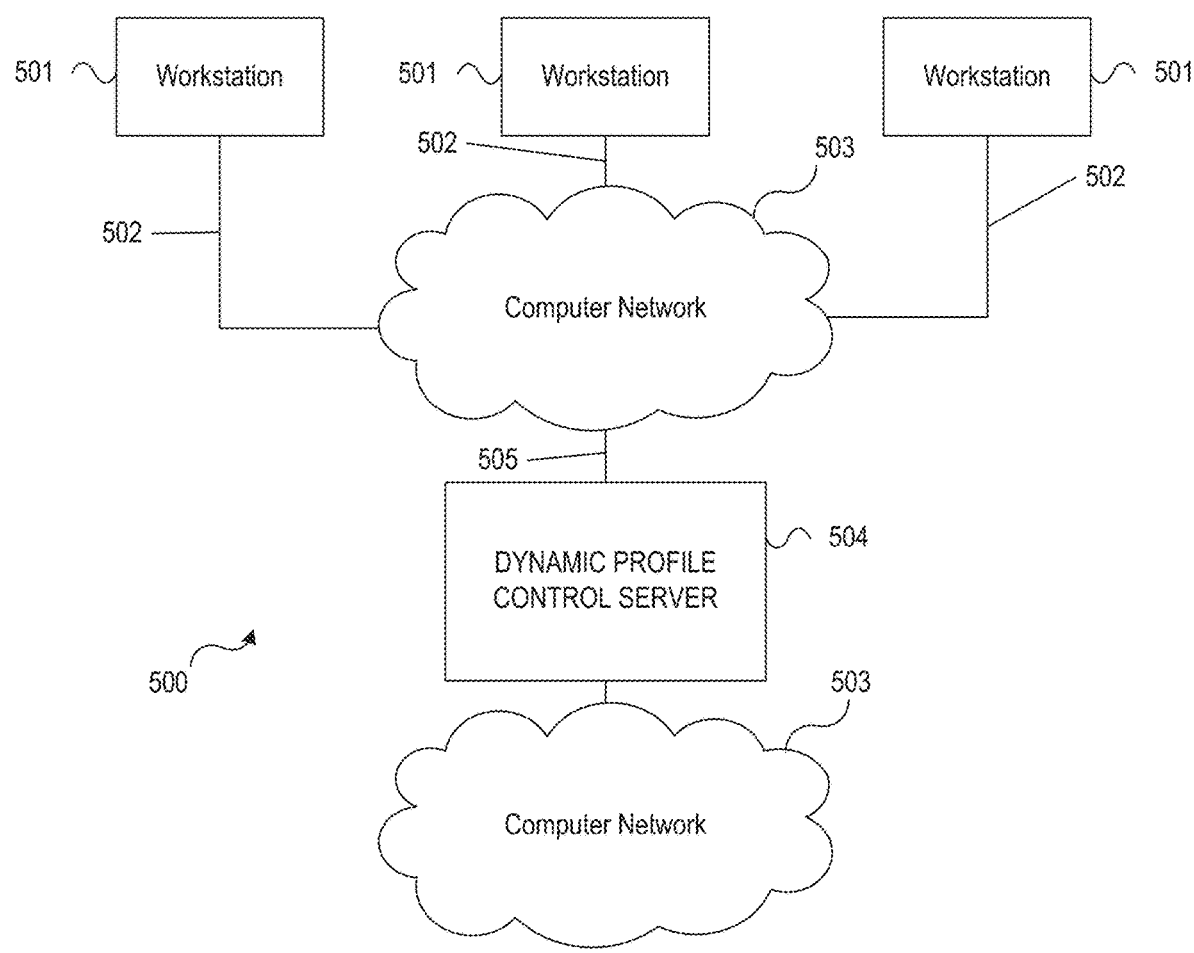
FIG. 5 depicts an illustrative block diagram of workstations and servers that may be used to implement the processes and functions of certain aspects of the present disclosure in accordance with one or more aspects described herein.

FIG. 5 depicts an illustrative block diagram of workstations and servers that may be used to implement the processes and functions of certain aspects of the present disclosure in accordance with one or more example embodiments. Referring to FIG. 5, illustrative system 500 may be used for implementing example embodiments according to the present disclosure. As illustrated, system 500 may include one or more workstation computers 501. Workstation 501 may be, for example, a desktop computer, a smartphone, a wireless device, a tablet computer, a laptop computer, and the like, configured to perform various processes described herein. Workstations 501 may be local or remote, and may be connected by one of communications links 502 to computer network 503 that is linked via communications link 505 to dynamic profile control server 504. In system 500, dynamic profile control server 504 may be a server, processor, computer, or data processing device, or combination of the same, configured to perform the functions and/or processes described herein. Server 504 may be used to receive check data, analyze check data, identify a tier, generate a check profile, receive and analyze subsequent check data, modify a tier, and the like.

Computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 502 and 505 may be communications links suitable for communicating between workstations 501 and dynamic profile control server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive first check data for a first time period;
      analyze the first check data to determine a total number of checks from the first time period;
      compare the total number of checks from the first time period to a plurality of thresholds to identify a first tier level;
      build a check profile based on the identified first tier level, including:
         receiving one or more checks;
         determining a validity score associated with each received check of the one or more checks by comparing each check of the received one or more checks to at least one other check to identify a number of matching items between each check of the one or more received checks and the at least one other check; and
         modifying the check profile to include images of the received one or more checks and the validity score associated with each check of the one or more checks;
      determine that a predetermined period of time has elapsed;
      responsive to determining that the predetermined period of time has elapsed, receive second check data for a second time period different from the first time period;
      analyze the second check data to determine a total number of checks from the second time period;
      compare the total number of checks from the second time period to a threshold corresponding to the first tier level;
      responsive to determining that the total number of checks from the second time period is at or below the threshold corresponding to the first tier level, maintaining the first tier level and storing the check profile; and
      responsive to determining that the total number of checks from the second time period is above the threshold corresponding to the first tier level, identifying a second, different tier level and modifying the check profile to execute one or more parameters of the second tier level.

2. The computing platform of claim 1, wherein the parameters of the second tier level include at least one of: a minimum number of checks in the check profile and a maximum number of checks in the check profile.

3. The computing platform of claim 2, wherein executing the one or more parameters of the second tier level includes increasing the at least one of: the minimum number of checks in the check profile and the maximum number of checks in the check profile.

4. The computing platform of claim 1, wherein modifying the check profile to include images of the received one or more checks is performed after the one or more checks have been evaluated for validity.

5. The computing platform of claim 1, wherein modifying the check profile to include images of the received one or more checks further includes adding the images of the received one or more checks after holding the received one or more checks for a predetermined time period.

6. The computing platform of claim 1, wherein building the check profile is performed until at least a minimum number of checks is stored in the check profile.

7. The computing platform of claim 6, wherein building the check profile is performed until a maximum number of checks is stored in the check profile.

8. A method, comprising:
   at a computing platform comprising at least one processor, memory, and a communication interface:
      receiving, by the at least one processor and via the communication interface, first check data for a first time period;

analyzing, by the at least one processor, the first check data to determine a total number of checks from the first time period;

comparing, by the at least one processor, the total number of checks from the first time period to a plurality of thresholds to identify a first tier level;

building, by the at least one processor, a check profile based on the identified first tier level, including:
  receiving one or more checks;
  determining a validity score associated with each received check of the one or more checks by comparing each check of the received one or more checks to at least one other check to identify a number of matching items between each check of the one or more received checks and the at least one other check; and
  modifying the check profile to include images of the received one or more checks and the validity score associated with each check of the one or more checks;

determining, by the at least one processor, that a predetermined period of time has elapsed;

responsive to determining that the predetermined period of time has elapsed, receiving by the at least one processor and via the communication interface, second check data for a second time period different from the first time period;

analyzing, by the at least one processor, the second check data to determine a total number of checks from the second time period;

comparing, by the at least one processor, the total number of checks from the second time period to a threshold corresponding to the first tier level;

upon determining that the total number of checks from the second time period is at or below the threshold corresponding to the first tier level, maintaining, by the at least one processor, the first tier level and storing the check profile; and upon determining that the total number of checks from the second time period is above the threshold corresponding to the first tier level, identifying, by the at least one processor, a second, different tier level and modifying the check profile to execute one or more parameters of the second tier level.

9. The method of claim 8, wherein the parameters of the second tier level include at least one of: a minimum number of checks in the check profile and a maximum number of checks in the check profile.

10. The method of claim 9, wherein executing the one or more parameters of the second tier level includes increasing the at least one of: the minimum number of checks in the check profile and the maximum number of checks in the check profile.

11. The method of claim 8, wherein modifying the check profile to include images of the received one or more checks is performed after the one or more checks have been evaluated for validity.

12. The method of claim 8, wherein modifying the check profile to include images of the received one or more checks further includes adding the images of the received one or more checks after holding the received one or more checks for a predetermined time period.

13. The method of claim 8, wherein building the check profile is performed until at least a minimum number of checks is stored in the check profile.

14. The method of claim 13, wherein building the check profile is performed until a maximum number of checks is stored in the check profile.

15. One or more non-transitory computer-readable media storing instructions that, when executed by a computing platform comprising at least one processor, memory, and a communication interface, cause the computing platform to:
  receive first check data for a first time period;
  analyze the first check data to determine a total number of checks from the first time period;
  compare the total number of checks from the first time period to a plurality of thresholds to identify a first tier level;
  build a check profile based on the identified first tier level, including:
    receiving one or more checks;
    determining a validity score associated with each received check of the one or more checks by comparing each check of the received one or more checks to at least one other check to identify a number of matching items between each check of the one or more received checks and the at least one other check; and
    modifying the check profile to include images of the received one or more checks and the validity score associated with each check of the one or more checks;
  determine that a predetermined period of time has elapsed;
  responsive to determining that the predetermined period of time has elapsed, receive second check data for a second time period different from the first time period;
  analyze the second check data to determine a total number of checks from the second time period;
  compare the total number of checks from the second time period to a threshold corresponding to the first tier level;
  responsive to determining that the total number of checks from the second time period is at or below the threshold corresponding to the first tier level, maintaining the first tier level and storing the check profile; and
  responsive to determining that the total number of checks from the second time period is above the threshold corresponding to the first tier level, identifying a second, different tier level and modifying the check profile to execute one or more parameters of the second tier level.

16. The one or more non-transitory computer-readable media of claim 15, wherein the parameters of the second tier level include at least one of: a minimum number of checks in the check profile and a maximum number of checks in the check profile.

17. The one or more non-transitory computer-readable media of claim 16, wherein executing the one or more parameters of the second tier level includes increasing the at least one of: the minimum number of checks in the check profile and the maximum number of checks in the check profile.

18. The one or more non-transitory computer-readable media of claim 15, wherein modifying the check profile to include images of the received one or more checks is performed after the one or more checks have been evaluated for validity.

19. The one or more non-transitory computer-readable media of claim 15, wherein modifying the check profile to include images of the received one or more checks further includes adding the images of the received one or more checks after holding the received one or more checks for a predetermined time period.

20. The one or more non-transitory computer-readable media of claim 15, wherein building the check profile is performed until at least a minimum number of checks is stored in the check profile.

21. The one or more non-transitory computer-readable media of claim 20, wherein building the check profile is performed until a maximum number of checks is stored in the check profile.

* * * * *